April 19, 1949. T. B. MONTGOMERY ET AL 2,467,768
CONTROL SYSTEM
Filed Jan. 27, 1944

Inventors
T. B. Montgomery
H. E. Reichert
by Harold J. Silver
Attorney

Patented Apr. 19, 1949

2,467,768

UNITED STATES PATENT OFFICE 2,467,768

CONTROL SYSTEM

Terryl B. Montgomery, Wauwatosa, Wis., and Harold E. Reichert, Long Beach, Calif., assignors to Allis-Chalmers Manufacturing Company, Milwaukee, Wis., a corporation of Delaware Application January 27, 1944, Serial No. 519,886

5 Claims. (Cl. 51—75)

This invention relates in general to an electrical control system and particularly to a control system for a motor utilized in performing an operation on strip or chain material being pulled or fed past the motor.

In prior art systems of the above type, where the operations performed on the feeding material are of the type of intermittent grinding operations, the load on the grinder motor is a function of the amount of material to be ground off and also a function of the speed of the material past the grinding wheel. If the amount of material to be ground off is a variable factor, it is not feasible to predetermine the electrical load on the motor during the grinding operation. If a constant feeding speed was set slow enough to avoid grinder motor overload during maximum load periods, the speed of material was much slower than necessary during minimum load periods and in between grinding periods. If a higher speed was set, there was danger of stalling the grinding wheel during the grinding period and cracking the wheel, burning out the grinder motor or disrupting the driving links between motor and grinding wheel.

It is therefore an object of the present invention to provide an electrical control system avoiding the above disadvantages.

It is also an object of this invention to provide a control system of the above type that is independent of whether the operating motor is an alternating current motor or a direct current motor.

It is also an object of the present invention to provide a control system of the above type that will function although a plurality of operating motors of differing sizes and characteristics are used.

It is a further object of the present invention to provide a control system of the above type that will permit maximum speed of the material between the intermittent operation periods and which will maintain a speed of such material during operation periods such that maximum full load on the operating motor is permitted but overloading of the operating motor is prevented.

Figure 1:
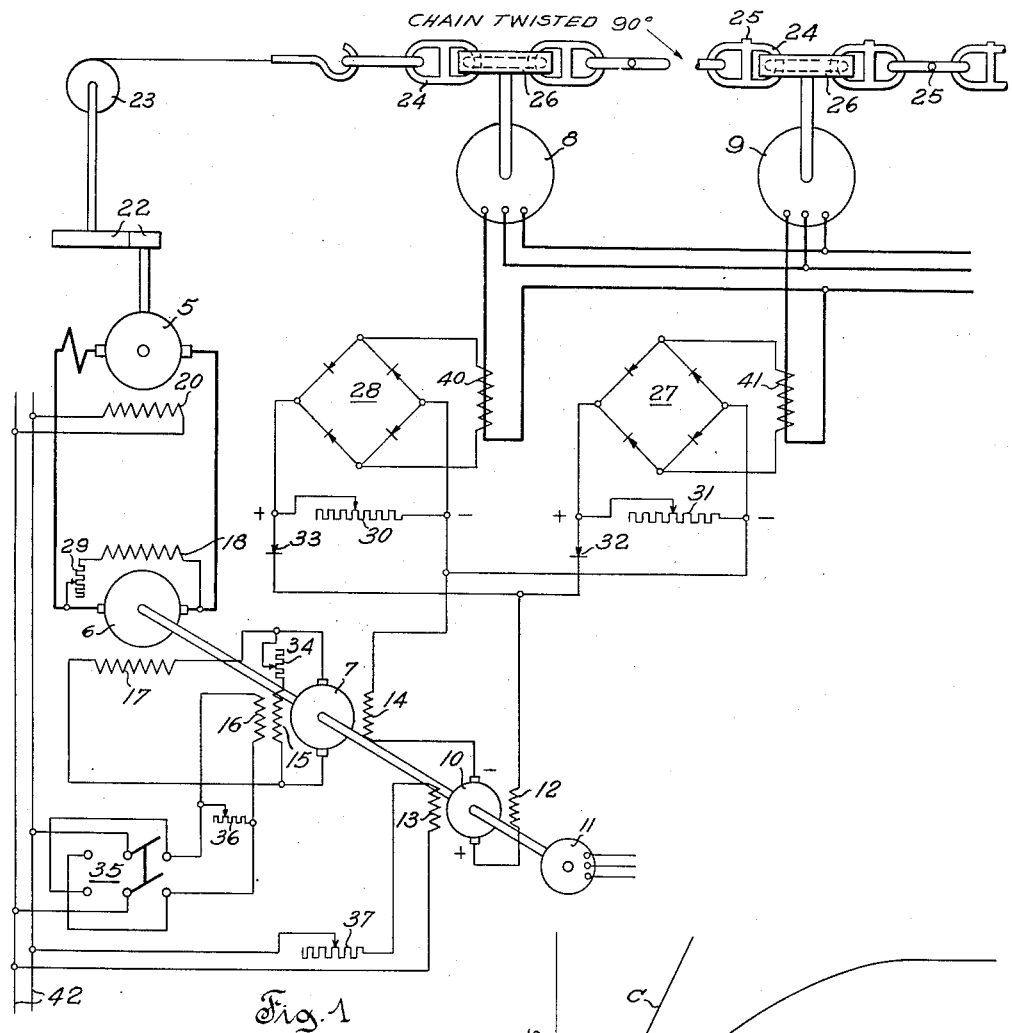
Figure 2:
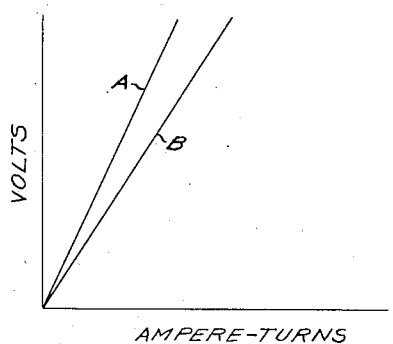
Figure 3:
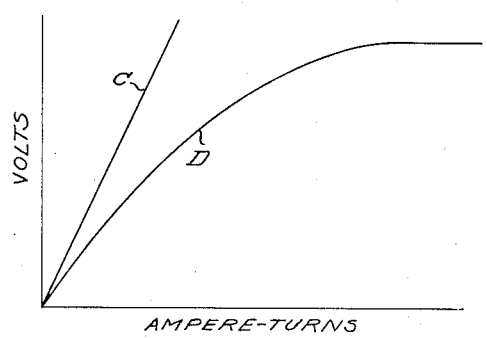

Objects and advantages other than those above set forth will be apparent from the following description when read in connection with the accompanying drawing, in which:

Fig. 1 is a schematic diagram of connections of a control system embodying the present invention; and Figs. 2 and 3 are characteristic curves of machines shown in Fig. 1.

In the control system shown in Fig. 1, a winch 23 is shown as pulling an anchor chain 24 through grinding jigs (not shown) which guide and hold the links of the chain while the riser stubs 25 are ground off by the grinding wheels 26. Each of the grinding wheels 26 grinds every other chain link and the chain has a 90 degree twist therein between the grinding wheels 26, so that the links not ground by the wheel 26 driven by motor 9 are ground by the other wheel 26. The chain 24 is pulled past the grinding wheels 26 by means of a motor 5 operatively connected to the winch 23 by any conventional speed reducing means 22 such as gears, so that the average chain speed can be of the order of ten to fifteen feet per minute.

The grinding wheels 26 are shown as driven by alternating current motors 8 and 9 supplied from a suitable source of current (not shown). If the chain 24 be pulled at too great a speed during the grinding operation, there is danger of stalling the grinder during the grinding period and either cracking the grinding wheel 26, burning out the grinder motors 8 or 9, or disrupting the drive links between the motors 8 and 9 and the grinding wheels 26. The size of the riser stubs 25 is not uniform and, therefore, the grinding load varies.

The speed of winch motor 5 is controlled by control of a generator 6 supplying current thereto and generator 6 is in turn controlled by control generator or exciter 7 connected in circuit with a field 17 on generator 6. In the embodiment illustrated in the drawing, the winch motor 5 has constant field excitation from the field 20 shown connected to a constant source of direct current 42, and the controlled variable output of the generator 6 is supplied to the armature circuit of motor 5 for controlling the speed thereof.

Control exciter 7 has a self-excited field 15 and a field 16 separately excited from the source 42. The current direction in field 16 is controlled by reversing switch 35. These two fields supply the necessary excitation to machine 7 to produce the maximum desired speed of winch motor 5 in between grinding periods.

A control field 14 on machine 7 is deenergized whenever current in the grinder motors 8 and 9 is below a predetermined value. Current transformers 40 and 41 measure the load current of the grinder motors 8 and 9 and the output of these transformers is rectified at the bridge rectifiers 26 and 27 and supplied to resistances 30 and 31. The values of the resistances 30 and 31 are adjusted to give a voltage drop of a predetermined value at full load current on the motors 8 and 9. A reference source of voltage is obtained from an auxiliary generator 10 connected in series with and in opposed relation to the voltage drop across resistances 30 and 31 and in series with the field 14 of the control exciter 7. The auxiliary generator 10 is shown with a series field 12 providing IR drop compensation for load changes, so that a constant reference voltage is provided. The three machines 6, 7 and 10 are shown as driven at a constant speed by an alternating current motor 11.

When the chain 24 is being pulled through the grinding jigs and the grinding wheel 26 contacts a riser stub 25, the load on motors 8 and 9 will increase. The increase in load increases the output of transformers 40 and 41, thereby increasing the voltage drop across resistors 30 and 31. If the load on both of the motors 8 and 9 is below a predetermined maximum, no current can flow in the circuit including auxiliary generator 10 and field 14 because of the valve action of rectifiers 32 and 33. If, however, the voltage drop across resistor 30 or 31 exceeds a predetermined value, current will flow in field 14 in a direction opposed to the net excitation of fields 15 and 16 thus decreasing the voltage of generator 6.

The field 14 must be strong enough to reverse the voltage of exciter 7, so that the motor 5 can be momentarily stopped if necessary to avoid overload on motors 8 or 9. Reversal of voltage of exciter 7 will reverse the current in field 17 of generator 6. Field 17 is strong enough to counterbalance the self-excited field 18, and as the volt-ampere line C of generator 6 lies to the left of the saturation curve D, as shown in Fig. 3, the voltage of generator 6 will immediately drop to zero if only the self-excited field 18 is energized. The relation of the volt-ampere line to the saturation curve as shown in Fig. 3 is obtained by proper adjustment of resistance 29.

Reduction of voltage supplied to motor 5 reduces its speed to a value such that the load on the grinding motors 8 and 9 does not exceed the predetermined maximum safe value. When the current in motors 8 or 9 has dropped to full load or below, current ceases to flow in field 14 and the voltage of control exciter 7 again builds up, thereby increasing the speed of the winch motor 5 to its normal full speed.

The above functioning of control exciter 7 is the same whether motor 8 or motor 9 or both are overloaded, and any number of additional motors could be added and similarly controlled. The control of the speed of motor 5 is entirely independent of the number or relative sizes of the grinder motors. The motors 8 and 9 could have different characteristics and be of different sizes, and by proper adjustment of resistances 30 and 31 and by proper size of transformers 40 and 41, proper voltage drops for control of field 14 could be obtained.

The control exciter 7 functions more accurately if of the general type disclosed in U. S. Letters Patent 2,335,784 to T. B. Montgomery, J. F. Sellers and W. M. Pickslay, and if the saturation curve is a straight line throughout the operating range of control exciter 7 as shown by curve B in Fig. 2 and in which the shunt field circuit has a resistance of a predetermined value such that the volt-ampere line bears a predetermined relation to the saturation curve. The resistance 34 is set so that the volt-ampere line of the machine 7 (curve A of Fig. 2) is slightly to the left of the saturation curve. It has been found that desirable performance characteristics of the machine 7 are obtained if the energization provided by self-excited field 15 is 15 to 25 percent of the total energization provided by the two fields 15 and 16. By having the volt-ampere line to the left of the saturation curve, so that the excitation supplied by field 15 is less than that required to sustain any given voltage appearing at the terminals of exciter 7, the voltage of exciter 7 will immediately drop to zero if field 14 counterbalances field 16. The saturation curve B may be made a straight line over the operating range of machine 7 in any well known prior art manner, such, for example, as by increasing the proportions of the magnetic circuit of machine 7.

The control system of the present invention will, therefore, function to maintain the highest desired feeding speed of motor 5, limited only to prevent overloading of motors 8 and 9. This system will permit maximum production while maintaining proper protection of motors 8 and 9, grinding wheels 26 and the driving mechanism between them. Although a specific chain grinding system has been illustrated and described as an example of this invention, this system is applicable to any control of other chain grinding operations or of any strip material being pulled or fed past an operation performing means, the load of which can be measured electrically.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In combination, means comprising a first electric motor for intermittently performing an operation on a strip of material at spaced points therealong, means comprising a second motor for feeding said strip past said operation performing means, means for controlling said second motor to provide a predetermined maximum feeding speed of said strip at times other than during said operations, and means for controlling said second motor to control the feeding speed of said strip to a value preventing increase of electrical load on said first motor above a predetermined value during said operations, said means comprising a generator for controlling the speed of said second motor and provided with field means thereon energized dependently upon the magnitude of electrical load on said first motor.

2. In combination, means comprising a first electric motor for intermittently performing an operation on a strip of material at spaced points therealong, means comprising a second motor for feeding said strip past said operation performing means, means for controlling said second motor to provide a predetermined maximum feeding speed of said strip at times other than during said operations, and means for controlling said second motor to control the feeding speed of said strip to a value preventing increase of electrical load on said first motor above a predetermined value during said operations, said means comprising a generator provided with a magnetic circuit of such proportions that the saturation curve thereof is substantially a straight line throughout the operating range of said generator and further provided with a shunt field circuit having an established resistance such that said shunt field supplies less excitation than is necessary to sustain any given terminal voltage of said generator and further provided with control field means operatively energizable only when the electrical load of said first motor exceeds a predetermined value.

3. A system for controlling the grinding of a chain having a plurality of links, said system comprising in combination means for continually grinding said links, a motor connected for driving said grinding means, means comprising a second motor for pulling said chain past said grinding means whereby the electrical load on said grinder motor is a function of said chain speed and of the amount of chain material ground off, and means for maintaining the speed of said second motor at the maximum possible without the electrical load on said grinder motor exceeding a predetermined amount, said speed maintaining means comprising a generator connected to control said second motor and provided with field winding means operatively energized dependently upon the electrical load on said first motor exceeding a predetermined value.

4. In combination, means comprising a first electric motor for performing an operation on a strip of material, means comprising a second electric motor for feeding said strip past said operation performing means, means for controlling said second motor to provide the maximum feeding speed of said strip permissible without overloading said first motor, said means comprising a first generator connected to supply current to said second motor, said means further comprising a control generator connected to supply field energization to said first generator and provided with field winding means connected to be energized operably to reduce the terminal voltage of said control generator when the electrical load on said first motor exceeds a predetermined value.

5. In combination, means comprising a first electric motor for performing an operation on a strip of material, means comprising a second electric motor for feeding said strip past said operation performing means, means for controlling said second motor to provide the maximum feeding speed of said strip permissible without overloading said first motor, said means comprising a first generator connected to supply current to said second motor and provided with a shunt field circuit of established resistance such that said shunt field supplies less excitation than is necessary to sustain any given terminal voltage of said generator, said means further comprising a control generator having a straight line saturation curve and connected to supply field energization to said first generator and provided with field winding means connected to be energized operably to reduce the terminal voltage of said control generator when the electrical load on said first motor exceeds a predetermined value, and further provided with a shunt field circuit of established resistance such that said shunt field supplies less excitation than is necessary to sustain any given terminal voltage of said control generator.

TERRYL B. MONTGOMERY.
HAROLD E. REICHERT.

REFERENCES CITED

The following references are of record in the file of this patent:

UNITED STATES PATENTS

| Number | Name | Date |
| --- | --- | --- |
| 1,989,523 | Mohler | Jan. 29, 1935 |
| 1,996,467 | Ernst | Apr. 2, 1935 |
| 2,129,049 | Doran | Sept. 6, 1938 |
| 2,134,514 | Heymann | Oct. 25, 1938 |
| 2,340,060 | King et al. | Jan. 25, 1944 |

FOREIGN PATENTS

| Number | Country | Date |
| --- | --- | --- |
| 363,544 | Great Britain | Dec. 24, 1931 |